United States Patent [19]

Perlman

[11] Patent Number: 5,892,828
[45] Date of Patent: *Apr. 6, 1999

[54] USER PRESENCE VERIFICATION WITH SINGLE PASSWORD ACROSS APPLICATIONS

[75] Inventor: Radia Perlman, Acton, Mass.

[73] Assignee: Novell, Inc., Orem, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 735,677

[22] Filed: Oct. 23, 1996

[51] Int. Cl.$^6$ ........................................... H04L 9/00
[52] U.S. Cl. ............................................... 380/25
[58] Field of Search .................... 380/23, 25, 4

[56] References Cited

U.S. PATENT DOCUMENTS

| | | | |
|---|---|---|---|
| 5,073,933 | 12/1991 | Rosenthal | 380/25 |
| 5,349,642 | 9/1994 | Kingdon | 380/25 |
| 5,418,854 | 5/1995 | Kaufman et al. | 380/23 |
| 5,421,006 | 5/1995 | Jablow et al. | 380/4 |
| 5,491,752 | 2/1996 | Kaufman et al. | 380/25 |
| 5,497,421 | 3/1996 | Kaufman et al. | 380/25 |
| 5,594,921 | 1/1997 | Pettus . | |
| 5,606,614 | 2/1997 | Brady et al. | 380/23 |
| 5,638,513 | 6/1997 | Ananda | 395/188.01 |
| 5,652,793 | 7/1997 | Priem et al. | 380/25 |
| 5,751,812 | 5/1998 | Anderson | 380/48 |
| 5,771,287 | 6/1998 | Gilley et al. | 380/4 |
| 5,774,552 | 6/1998 | Grimmer | 380/25 |
| 5,784,560 | 7/1998 | Kingdon et al. . | |

OTHER PUBLICATIONS

"Using Netscape 2," Second Edition, Que Corporation, 1995.
"Manual of the Automated Patent System," APS–TR–TRG–00–06.03, Planning Research Corporation, Chemical Abstracts Service, Sep. 1988.
"Manual of the Automated Patent System," APS–TR–TRG–00–06.09, U.S. Department of Commerce, U.S. Patent and Trademark Office, May 29, 1990.

*Primary Examiner*—Salvatore Cangialosi
*Attorney, Agent, or Firm*—Cesari and McKenna, LLP

[57] ABSTRACT

A technique verifies the presence of a user to applications stored on a distributed network system using a single password. The technique generally comprises computing a one-way hash value of the password that is initially provided by the user to a workstation during a login procedure. This initial hash value is stored by the workstation so that it may be readily accessible for authenticating the user to other applications of the system. These other applications query the user as to its identity by issuing an operating system application programming interface (API) call that specifies, e.g., "quiz user for password". The API call invokes a routine that requests the user's password and, in response to that password, hashes it and compares the resulting hash value with the stored hash value. If the values match, the user is reliably authenticated.

15 Claims, 4 Drawing Sheets

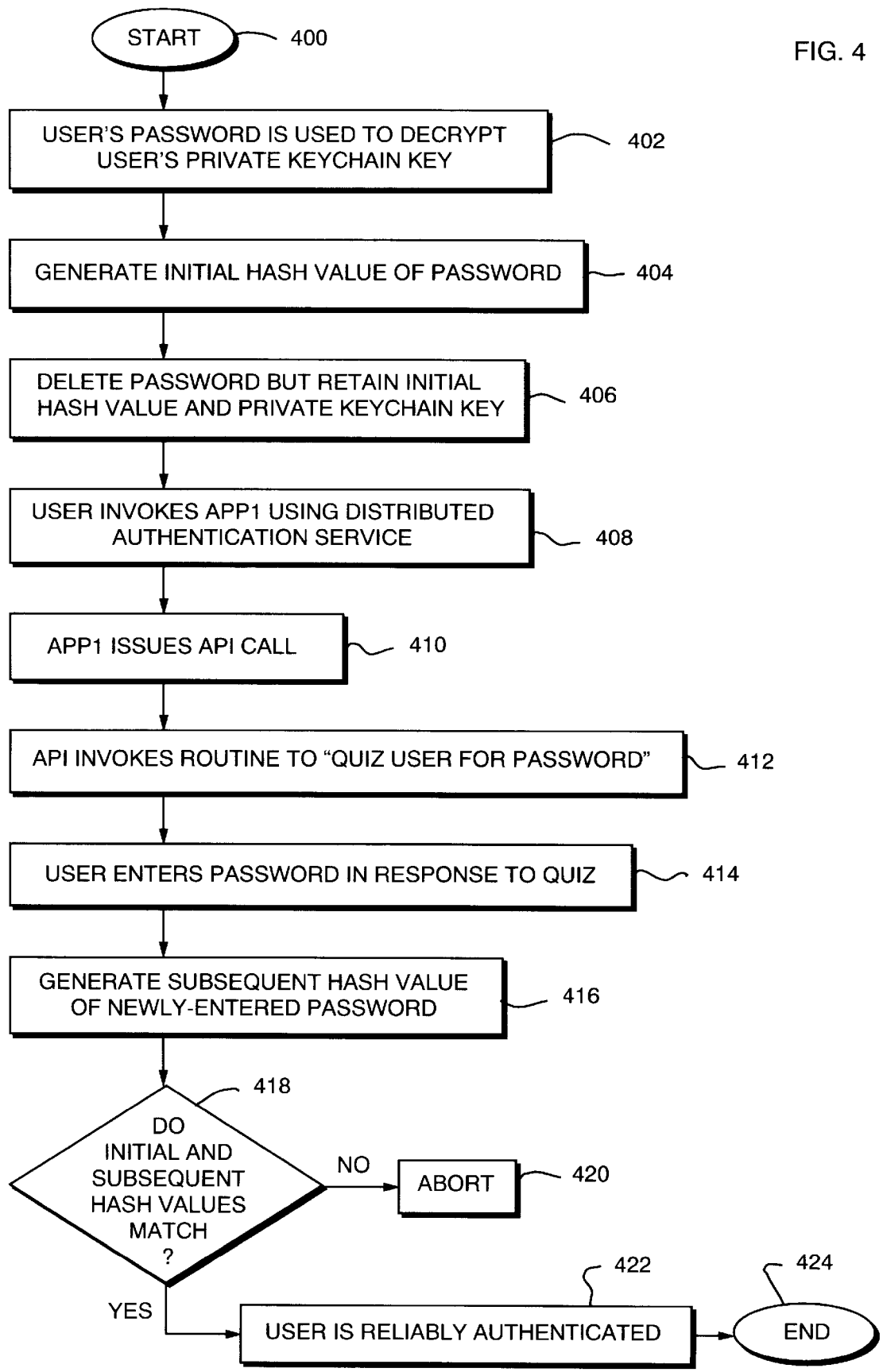

USER PRESENCE VERIFICATION WITH SINGLE PASSWORD ACROSS APPLICATIONS

FIELD OF THE INVENTION

This invention relates generally to distributed data processing systems and, more specifically, to a technique for verifying the presence of a user to various services and applications in a distributed network system.

BACKGROUND OF THE INVENTION

A distributed network system typically includes various computer nodes interconnected by a communications medium. The computer nodes may include nodes that are directly accessed by users, e.g., workstations, and nodes running specialized applications, e.g., servers. These nodes, the applications running on these nodes, and the users of the distributed system may be referred to as "principals." The methodology employed to reliably verify the identity of a user of a distributed network system prior to allowing the user access to system resources and applications is referred to as authentication. Authentication is generally performed on behalf of the principals.

In a typical distributed network system, the user sends a password to each application running on a remote node in order to access its resources. If the password for each application is different, remembering the password and its associated application may be rather difficult and unpleasant. The user could simply set each password for each application to the same value, but this presents the problem that if the user changes one password and forgets to change the others, the passwords will diverge.

On the other hand if the user has the same password for all applications, the local application with which the user "logs-in" typically saves the entered password and automatically sends it to remote applications as needed. This type of remote authentication is susceptible to a password-based system threat known as eavesdropping, i.e., interception of the password by wiretapping the network. To counter such a threat, cryptography is often used to preserve the confidentiality of the transmitted password when authenticating the user to remote applications.

A well-known cryptographic technique used to perform remote authentication is public key cryptography. In this method of secure communication, each principal has a public encryption key and a private encryption key, and two principals can communicate knowing only each other's public keys and, of course, their own private keys. An encryption key is a code or number which, when taken together with an encryption algorithm, defines a unique transformation used to encrypt or decrypt data. A public key system may be used in such a way as to ensure that information being transmitted cannot be understood by an eavesdropper, as well as to ensure the authenticity of the sender of the information.

The manner in which a public key cryptography system operates to ensure authentication may be understood without reference to the mathematical transformations that are used for encryption and decryption. Public key cryptography is also referred to as "asymmetric" encryption because information encoded with a public key may be decoded only by using a complementary private key, the associated public and private keys defining a key pair. According to this type of encryption, the private key is known only to the owner of the key, while the public key is known to other principals in the system.

Accordingly, to effect a secure transmission of information to a recipient, a principal encodes ("encrypts") the information with the recipient's public key. Since only the intended recipient has the complementary private key, only that principal can decode ("decrypt") it. On the other hand, to prove to a recipient of information that the sender is who he purports to be, the sender encodes ("signs") the information with its private key. If the recipient can decode ("verify") the information, it knows that the sender has correctly identified itself. In public key cryptography, each principal is responsible for knowing its own private key and all the public keys are generally accessible from one location, typically a directory service (DS).

Operation of a public key cryptography system will now be described with reference to an illustrative login authentication exchange between a workstation, acting on behalf of a user, and a remote server. Basically, the workstation encrypts a message for confidentiality by performing a transformation using the server's public key, and a server decrypts the message by performing a transformation using its private key.

A user logs into the workstation with the user's password and the workstation derives a secret encryption key by applying a known hash algorithm to the password prior to deleting it. The workstation then requests the user's private key from a DS of the remote server. The user's private key has previously been encrypted under the same secret encryption key and stored as a credential of the directory. A credential is a table entry comprising the user's name and the user's private key; in other words the credential is a representation of the user in the computer. The remote server returns the encrypted private key to the workstation, which uses the secret key to decrypt and obtain the private key.

By demonstrating possession of the private key, the workstation may thereafter attempt to access distributed system-based services or applications on behalf of the user. For example, the user may attempt to log into a different workstation or server, attempt to access a different operating system or attempt to access applications such as Lotus Notes or Novell GroupWise. Each of these entities typically includes a component referred to as an authentication agent that maintains the user's identity and secret (e.g., password). Although the user has been generally authenticated on the network, these agents may not be aware of that authentication, and thus query the user for a password. This can consume considerable bandwidth and can be quite intrusive to the user, particularly in systems requiring users to be authenticated whenever a resource is accessed.

A known mechanism for solving this problem is a single sign-on mechanism. Here, a main application stores the secrets of the other applications and, in response to an inquiry from an application, provides the appropriate secret on behalf of the user. The user thus does not have to retype the secrets, as it is assumed that if the user has successfully logged into the main application, the workstation can access the secrets of the other applications and provide them to the applications on behalf of the user.

Specifically, a group of encrypted application secrets are associated with the user; this group of secrets is referred to as a "keychain". The keychain is assigned a public/private key pair, wherein all of the secrets of the keychain are encrypted with the public key and the private key for the keychain is encrypted with the user's password. When the user logs into the main application with its password, this password is used to decrypt the user's private keychain key. The workstation then forgets the password but keeps the private keychain key accessible. The encrypted application-specific secrets are decryptable with the private keychain key. An application-specific secret may therafter be retrieved from the keychain and decrypted with the private keychain key.

Notably for security reasons, the password used for logging into the main application is not retained at the workstation, primarily because malicious software could capture the password and use it to impersonate the user. When implemented in a straightforward way, however, the single sign-on mechanism precludes periodic quizzing of the user for a password. But there are instances, such as after a period of no activity from the user, when it may be useful to quiz the user for its password to ensure that it is indeed still the user.

One approach to inquirying as to the user's identity involves repeating the illustrative login exchange whenever the user is required to type a password. This is undesirable because the exchange typically involves communication with another computer (e.g., the DS server) and that server might be unavailable when attempting to verify the user's password. Another option is to assign an application the responsibility of quizzing the user for a password and further assign the application its own version of the password. This approach is also undesirable because if the user changes its main password, the two passwords will be different.

The present invention avoids the disadvantages associated with these prior approaches and is directed to a technique for dynamically authenticating a user to various services and applications in a distributed network system.

SUMMARY OF THE INVENTION

The invention generally relates to a technique for verifying the presence of a user to applications stored on a distributed network system using a single password. Briefly, the technique generally comprises computing a one-way hash value of the password that is initially provided by the user to a workstation during a login procedure. This initial hash value is stored by the workstation so that it may be readily accessible for authenticating the user to other applications of the system. These other applications query the user as to its identity by issuing an operating system application programming interface (API) call that specifies, e.g., "quiz user for password". The API call invokes a routine that requests the user's password and, in response to that password, hashes it and compares the resulting hash value with the stored hash value. If the values match, the user is reliably authenticated.

In the illustrative embodiment of the invention, the user is associated with a "keychain" public/private key pair wherein the private keychain key is encrypted with the user's password and application-specific secrets are encrypted with the public keychain key. During the login procedure, the user provides the password to the workstation where it is used to decrypt the user's private keychain key and to generate an initial hash value. The workstation then "forgets" the password but, significantly, retains the hash value and private keychain key after the login procedure. The application-specific secrets are decrypted with the private keychain key and the retained hash value is used in conjunction with the API call, which is callable by any application, to inquire as to the identity of the user. In accordance with the invention, the user need only provide the main password in response to this inquiry.

Advantageously, the inventive technique provides an additional level of security for dynamically authenticating a user after a login procedure by requiring the user to retype a password. This technique is particularly suited to certain security-sensitive operations or for situations where no typing activity has occurred after some predetermined time period.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4 is a flowchart illustrating the sequence of steps for dynamically verifying the presence of a user when authenticating the user to various services and applications in a distributed network system in accordance with the invention.

DETAILED DESCRIPTION OF ILLUSTRATIVE EMBODIMENT

Figure 1:
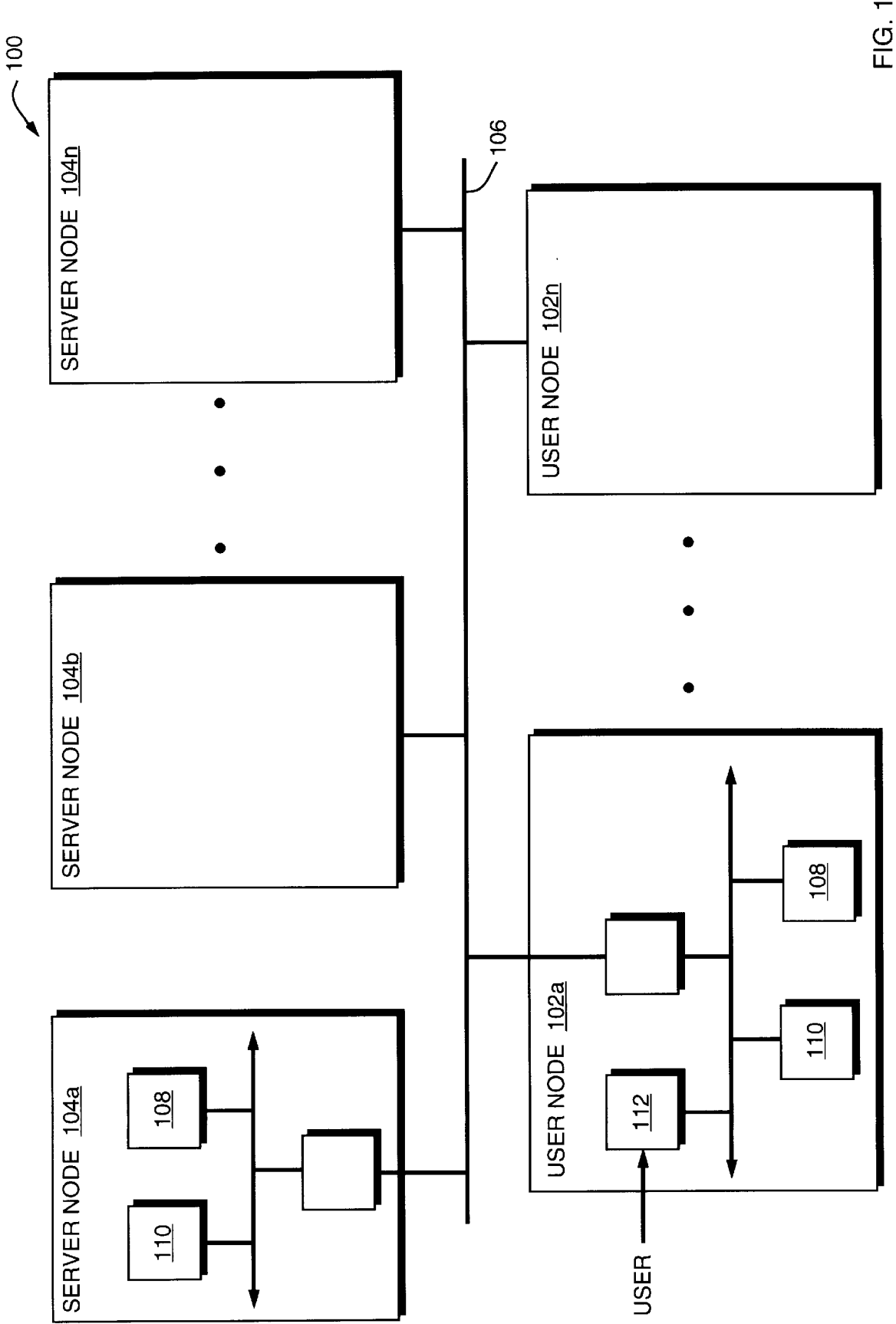
FIG. 1 is a diagram of a distributed network system in which the present invention may be used.

FIG. 1 illustrates a distributed network system 100 that includes a plurality of computer nodes, such as user nodes 102a–n and various server nodes 104a–n, interconnected by a communications medium 106. The user node, e.g., a workstation 102a, is a computer generally configured for use by one user at a time, whereas each server 104 is a computer resource running specialized software applications and services, typically for use by many users. In general, each of the computer nodes includes memory means 108 for storing software programs (e.g., operating system and applications) and data structures associated with the cryptographic methods and techniques described herein. The nodes further include processor means 110 for executing the software programs, including various algorithms for generating numbers and codes associated with, e.g., passwords and message digests, and for manipulating the stored data structures. It will be apparent to those skilled in the art that other processor and memory means, such as encoding and decoding devices, may be used within the teachings of the invention to implement the cryptographic authentication methods and techniques described herein.

To access resources of the network 100, a user typically "logs-in" with a server node 104 configured as a directory service (DS) through the local workstation 102a, and then remotely authenticates itself to those resources. Specifically, the user provides an authorized user identity (e.g., a user name) and a user secret (e.g., a password) to an input/output device 112 of the workstation 102a and the workstation authenticates the login attempt using a login authentication exchange with the DS. Once authenticated, the user receives its private key, which the workstation 102a uses in subsequent authentication exchanges with remote principals, such as server nodes 104.

Figure 2:
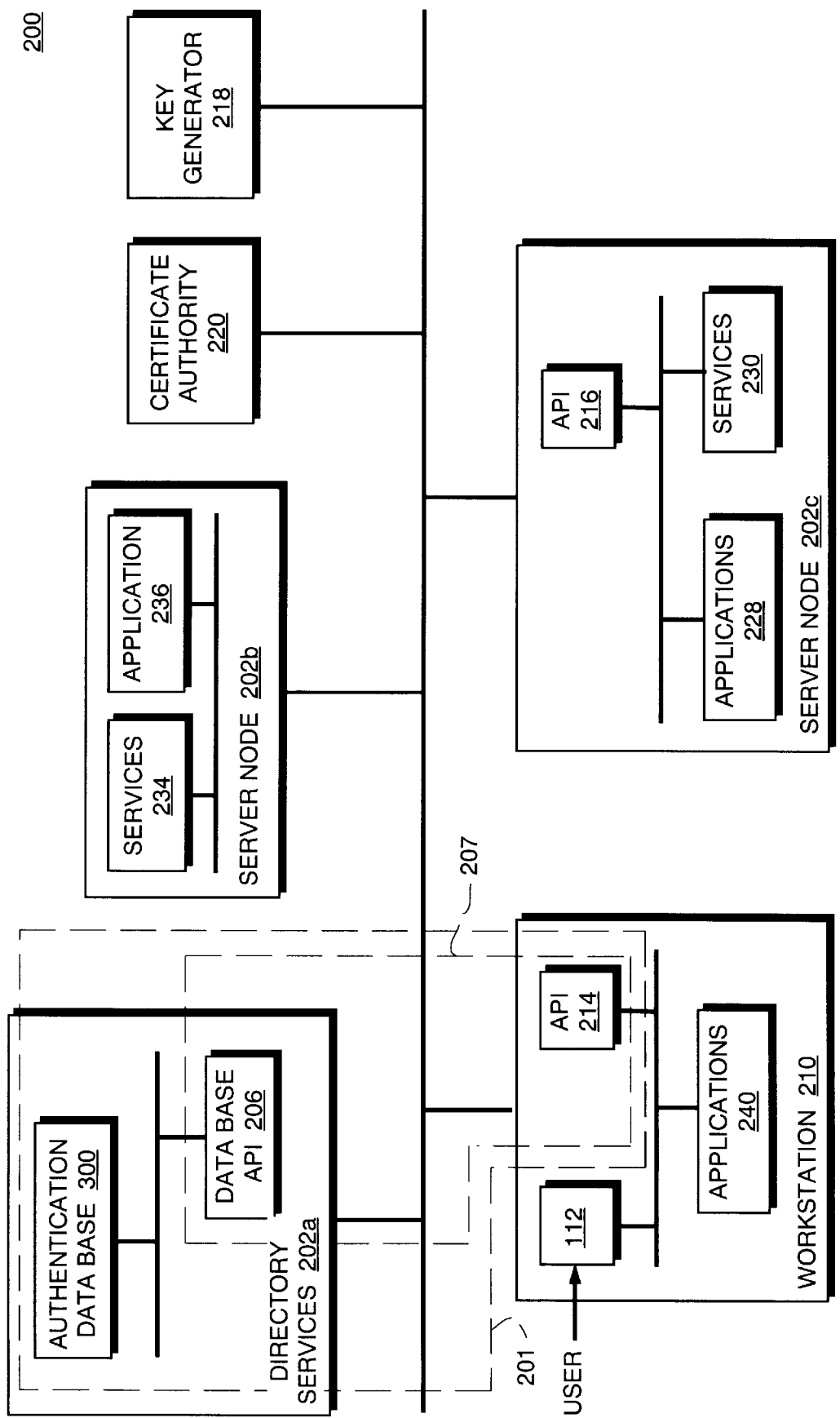
FIG. 2 is an exemplary embodiment of an authentication arrangement including a workstation and various servers that may be advantageously used in accordance with the invention.

An exemplary embodiment of an authentication exchange arrangement 200 that may be used with the present invention is shown in FIG. 2. The arrangement includes a workstation node 210, server nodes 202, a key generator server 218 and a certification authority 220. In general, the workstation node 210 provides an interface to a user when accessing specialized applications executing on the server nodes 202. The key generator 218 is an example of such a specialized server application that is used to register a user in the system by creating an account that includes the user's identity and secret (password). The key generator 218 also creates a private/public key pair for aspects of the present invention described below and, thus, must operate in a trustworthy fashion. That is, the generator must choose private/public key pairs at random and must either generate or accept from the users the keys or the passwords used to encrypt or decrypt data. Further, in most implementations, the key generator must reliably communicate the generated public key to another specialized server application called the certification authority 220, so that it may cryptographically bind the public key and the user name in a signed "certificate". The certificate and the private key are then returned to the DS for storage with user information.

The workstation and server nodes may be further configured as a distributed authentication service 201 that automates an authentication exchange between a user interface 112 (hereinafter "user") and an application program 236. An example of a distributed authentication service suitable for use with the present invention is disclosed in copending and commonly-assigned U.S. patent application Ser. No. 08/617, 940, titled System and Method for Automatically Authenticating a User in a Distributed Network System, filed on Mar. 15, 1996, which application is hereby incorporated by reference as though fully set forth herein.

Briefly, the distributed service 201 comprises an exchange controller 207 coupled to an authentication database 300 containing a group of encrypted application secrets associated with the user. The controller 207, in turn, comprises an application program interface (API) that is distributed among user workstations (i.e., workstation API 214) and the authentication database (i.e., the database API 206). Typically, the applications and operating systems resident in the memories of the nodes interact via task commands of the API layers to control the operations of the nodes. Illustratively, both the database API and authentication database reside in a network directory services (NDS) system 202a.

The authentication database 300 is preferably a secure database containing groups of application secrets for predetermined application programs. Each group of application secrets, referred to as a "keychain", is assigned a public/private key pair by the key generator 218 when the keychain is created. The database 300 also contains user objects which associate a given user with one or more keychains. The database API 206 manages the authentication database 300 in response to task commands, such as queries, generated by workstation API 214.

Figure 3:
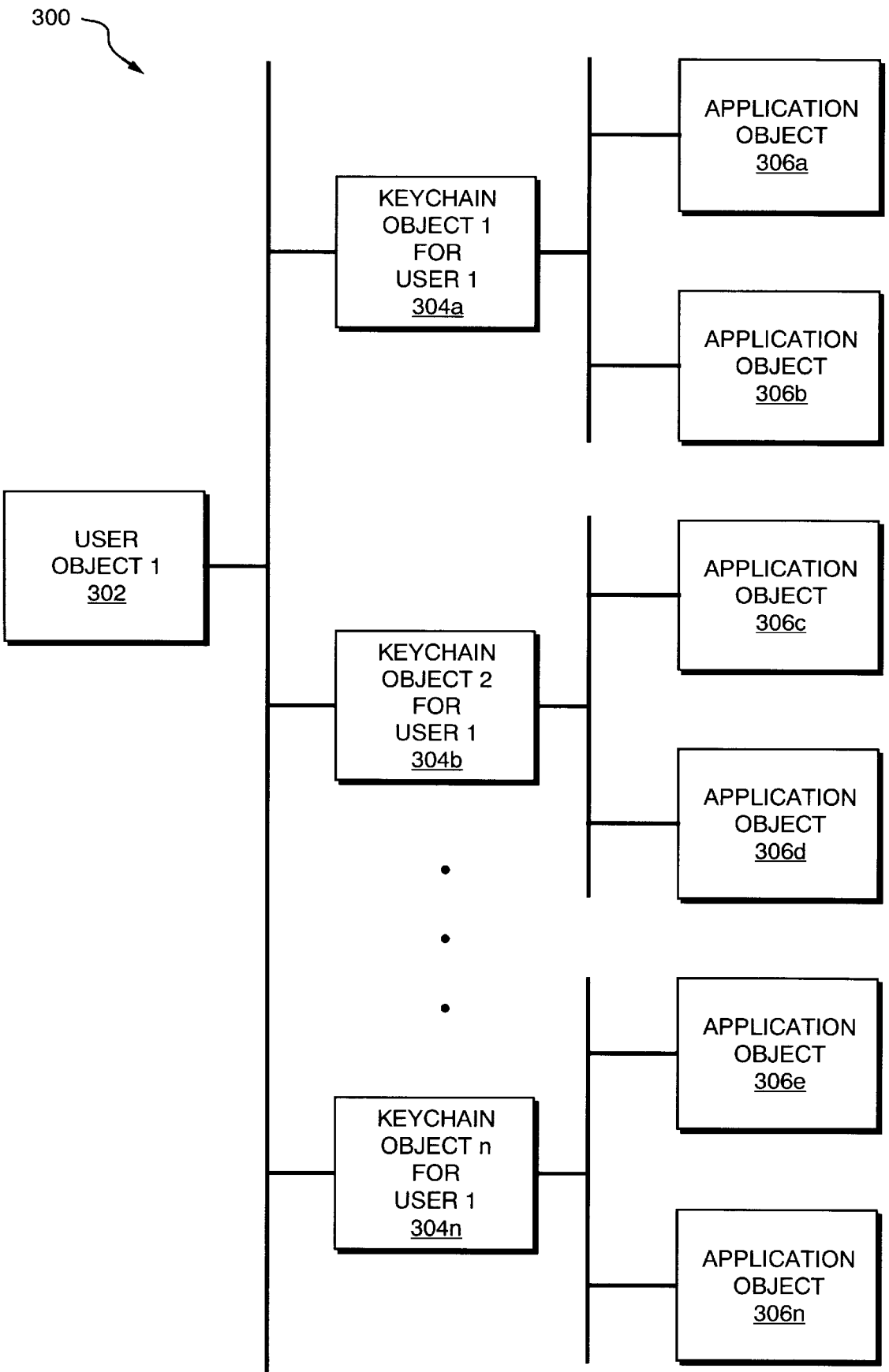
FIG. 3 is a schematized block diagram of a secure authentication database residing on a network directory services.

FIG. 3 is a schematized block diagram of the authentication database 300 which contains three types of associated data elements configured as objects: a user object 302, one or more keychain objects 304a–n associated with user object 302, and one or more application objects 306a–n associated with each keychain object 304. Each object preferably contains a number of attributes.

For every valid network user, the attributes of user object 302 include a login public/private key pair and a secret. The user object 302 is accessed by the NDS to initially authenticate the user when the user logs onto the network. Each application object 306 includes (for an associated application program) a program name, a list of users that have authority to access the program, and an application program identifier (ID). The program name attribute is a unique descriptive term that identifies the application program.

Keychain objects, or simply "keychains", are associated with one or more application objects based upon characteristics of the application programs. As noted, a keychain has as attributes at least one application secret and a public/private key pair; in the illustrative embodiment, the private keychain key is encrypted with the user's password and application-specific secrets are encrypted with the public keychain key. Each application-specific secret contains data used by the particular program to authenticate the user. The application secret is preferably the user's password for that program; however, it will be understood by those skilled in the art that the secret may be any type of secure identification mechanism.

Referring also to FIG. 2, application 236 issues an authentication inquiry to user 112 in response to an attempt by that user to access that application's processes or data. When the authentication inquiry is received at the controller, the workstation API 214 verifies that the user is a valid network client (i.e., has successfully logged-on and has been authenticated to the NDS) by requesting the proper application secret for application 236. In response to this latter request, the database API 206 accesses the authentication database 300 and provides an encrypted application secret along with the private key for decrypting the secret. The workstation API then decrypts and forwards the proper application secret (and user identity) to the application program.

Although this arrangement provides efficient authentication of a user to various application programs or systems in a distributed network without burdening the user or consuming considerable bandwidth, there may be instances when it is useful to quiz the user for its password to ensure that it is indeed still the user. The present invention is directed to a technique for dynamically verifying the presence of a user when authenticating the user to various services and applications in a distributed network system.

In accordance with the invention, the technique comprises computing a one-way hash value of the password that is initially provided by the user to the workstation during the login procedure. This initial hash value is stored by the workstation so that it may be readily accessible for authenticating the user to other applications of the system. These other applications thereafter query the user as to its identity by issuing an API call that specifies, e.g., "quiz user for password", as described below.

FIG. 4 is a flowchart illustrating the sequence of steps for dynamically verifying the presence of a user when authenticating the user to various services and applications in a distributed network system. The sequence starts at Step 400 and proceeds to Step 402 where, during the login procedure at the workstation, the user enters the password which is used to decrypt the user's private keychain key. In Step 404 the workstation generates an initial hash value of the password and then, in Step 406, the workstation "forgets", i.e., deletes, the password, but retains the hash value and private keychain key after the login procedure. In Step 408, the user invokes application App1 using the distributed authentication service to decrypt and forward the proper application secret to App1, as described above.

Later, App1 inquires as to the identity of the user to ensure that the correct user is present at the workstation. Specifically, in Step 410, App1 issues a system API call that specifies, e.g., "quiz user for password". The API call, in turn, invokes a routine in Step 412 that requests the user's password. The user enters the password in Step 414 and, in response to the subsequently entered password, the routine hashes that password in Step 416. In Step 418, the resulting hash value is compared with the stored hash value to determined whether they match. If the values match, the user is reliably authenticated in Step 422; if there is no match, the dynamic authentication sequence is aborted (Step 420). The sequence then ends in Step 424.

Advantageously, the inventive technique provides an additional level of security for dynamically authenticating a user after a login procedure by requiring the user to retype a password. This technique is particularly suited to certain security-senstive operations or for situations where no typing activity has occurred after some predetermined time period.

While there has been shown and described an illustrative embodiment for dynamically verifying the presence of a user when authenticating the user to various services and applications in a distributed network system, it is to be understood that various other adaptations and modifications may be made within the spirit and scope of the invention. For example in an alternate embodiment of the invention, additional system software routines may be used when implementing the invention in various applications. These additional system routines include dynamic link libraries (DLL), which are program files containing collections of programming functions and routines designed to perform specific classes of operations. These functions are invoked as needed by the applications to perform the desired operations. Specifically, DLLs, which are generally well-known, may be used to interact with the various applications and services in the distributed system to provide authentication-specific operations and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for dynamically verifying presence of a user at a non-server station of a distributed network system when authenticating the user to various services and applications in the system, the method comprising the steps of:

A. entering a user password at the station during a login procedure for initially authenticating said user to begin a session;

B. generating an initial hash value of the password and storing, at said station, that initial hash value after the login procedure;

C. invoking, after beginning the session but prior to termination of the session, a first application using a distributed authentication service, the first application issuing a predetermined application programming interface (API) call that requests the user password;

D. entering the user password at the station in response to the API call and generating a subsequent hash value of the user password;

E. comparing at said station, the subsequent hash value with the initial hash value; and F. verifying the presence of the user if the hash values match.

2. The method of claim 1 further comprising, after Step A, the steps of:

decrypting an encrypted private keychain key of the user with the password; and deleting the password.

3. The method of claim 2 further comprising, after Step B, the step of retaining the private keychain key.

4. The method of claim 3 wherein Step C further comprises the steps of:

decrypting an application secret associated with the first application; and forwarding the decrypted application secret to the first application.

5. The method of claim 4 wherein the predetermined API call specifies "quiz user for password".

6. The method of claim 1 further comprising, after Step F, the step of aborting authentication of the user to various services and applications in the system if there is no match.

7. Apparatus for dynamically verifying presence of a user at a non-server node of a network, the apparatus comprising:

a user input device for receiving a first entry and a subsequent entry of a password from the user, said first entry being for initially authenticating the user at said node to begin a session, and said subsequent entry being for authenticating said user after said session has begun but prior to termination of said session;

a processor operably connected to the input device and programmed to generate an initial hash value corresponding to the password; and a memory device operably connected to the processor for storing the initial hash value and an application programming interface executable by the processor to request the subsequent entry of the password;

the processor being further programmed to generate a subsequent hash value corresponding to the subsequent entry of the password and to compare the subsequent hash value with the initial hash value to dynamically verify the presence of the user at the node;

wherein the processor and the memory device are located at said node.

8. The apparatus of claim 7 wherein the memory device is further configured to store a private keychain key encrypted in a format that is decryptable using the password.

9. The apparatus of claim 8 wherein the memory device is further configured to retain the private keychain key.

10. The apparatus of claim 9 wherein the memory device is further organized as a data structure containing an encrypted secret associated with an application effective to invoke the application programming interface and a private key for decrypting the secret.

11. The apparatus of claim 10 wherein the encrypted secret comprises a secure identification mechanism.

12. A memory device containing data structures for use in dynamically verifying presence of a user at non-server node of a network, comprising:

a password structure adaptable to be input by said user for use in initially authenticating said user to begin a session;

an initial hash structure for being stored at said node and corresponding to the password structure;

an application adapted to use a distributed authentication service and to use an application programming interface effective to be executed by a processor located at said node to request, after said session has begun but prior to termination of the session, a new instance of the password structure to be input by the user;

a subsequent hash structure generated by the processor and corresponding to the new instance of the password structure; and a verification executable effective to be executed by the processor to compare the initial hash structure with the subsequent hash structure in order to determine whether said user is present at said node.

13. The memory device of claim 12 wherein the data structures further comprise a user object structure configured to associate the user with a keychain object structure.

14. The memory device of claim 13 wherein the keychain object structure comprises an application secret and a private keychain key encrypted to be decrypted by the password structure.

15. The memory device of claim 14 wherein the application secret contains data used by the application to authenticate the user.

* * * * *